Aug. 16, 1955 R. E. HONIG 2,715,339
ABSOLUTE MICROMANOMETER
Filed Aug. 9, 1950 2 Sheets-Sheet 1

RICHARD E. HONIG
INVENTOR.

BY Raymond W. Barclay
ATTORNEY

Aug. 16, 1955  R. E. HONIG  2,715,339
ABSOLUTE MICROMANOMETER
Filed Aug. 9, 1950  2 Sheets-Sheet 2

RICHARD E. HONIG
*INVENTOR.*

BY Raymond W. Barclay
ATTORNEY

United States Patent Office 2,715,339
Patented Aug. 16, 1955

2,715,339

ABSOLUTE MICROMANOMETER

Richard E. Honig, Woodbury, N. J., assignor to Socony Mobil Oil Company, Inc., a corporation of New York Application August 9, 1950, Serial No. 178,400

1 Claim. (Cl. 73—391)

This invention relates to a device for measuring and recording low gas pressures and, more particularly, is concerned with an absolute micromanometer and method for employing the same in the determination of low gas pressures and in the measurement of rapidly changing pressures.

The measurement of low gas pressures, say in the range of 1 to 100 microns, independent of sample composition is of interest in a number of applications, such as mass spectrometer inlet systems, vapor pressure measurements, etc. Vacuum gauges ordinarily used for measurement of gas pressures in this range, such as the Pirani or thermocouple gauges, are based on a physical property of the gas and therefore require a separate calibration for each gas. Such gauges, furthermore, cannot be applied to unknown gas mixtures. Absolute vacuum gauges do not depend on the nature of the gas whose pressure is being measured. A number of types have been used but in many instances such gauges are quite unsuitable. Thus, the McLeod gauge is not suitable for pressure measurements of condensible gases or where the gas may be adversely affected by contact with mercury. Other types of multiplying mercury manometers have been employed which are absolute gauges but which suffer from one or more of the disadvantages of bulk, vulnerability, limited accurary, long time-constant, limited sensitivity, and temperature dependence.

In accordance with the present invention, there has now been discovered an extremely sensitive micromanometer free of the aforesaid disadvantages and adapted for low pressure measurements and for the determination of rapidly changing pressures. Broadly stated, the micromanometer of this invention comprises a mechano-electronic transducer having a movable element, such as a movable plate or movable grid, which extends through a flexible diaphragm beyond the evacuated enclosed portion of the transducer and which is coupled mechanically to a sensitive bellows. Linear displacement of the bellows due to a change of pressure thereon causes corresponding movement of the movable transducer element which, in turn, effects a change in the current passing to the transducer plate. The resulting change in plate current is recorded on a suitable voltmeter or recording potentiometer from which the pressure differential causing said change may be readily determined.

The invention may be more readily understood by reference to the drawings attached hereto wherein.

Figure 1:
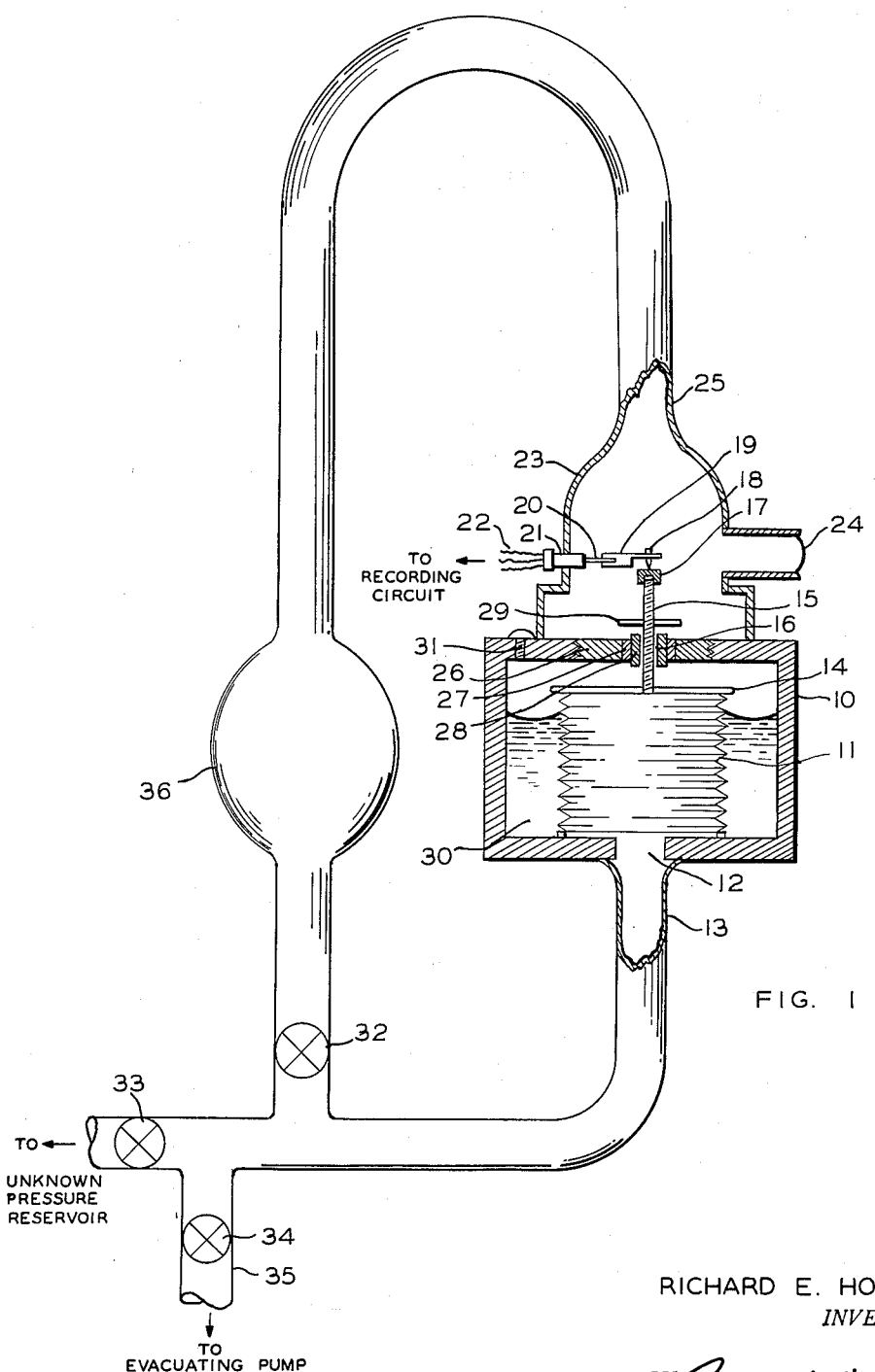
Figure 1 is a diagrammatic sketch illustrating the micromanometer of this invention.

Referring more particularly to Figure 1, numeral 10 designates a housing. Within housing 10 and affixed to the bottom thereof is a vertical bellows 11. The bottom of the housing is pierced by an opening 12, affording contact between the interior of the bellows resting over said opening and a conduit 13 affixed to the bottom of said housing and leading to the unknown pressure reservoir. Bellows 11 is provided with a solid top 14 to which is attached a screw 15 which extends vertically through opening 16 in said housing and terminates with an adjustable screw cap 17. Making contact with screw cap 17 is a needle 18 held in a vertical position with the point thereof directed downward by extension arm 19. Extension arm 19 is attached to the movable element 20 of mechano-electronic transducer 21, one type of which is shown in greater detail by Figure 2. The leads 22 from said transducer are affixed to a suitable electrical recording circuit such as that shown in Figure 3. Resting upon housing 10 and partially enclosing the aforementioned transducer and connecting elements is a second housing 23 through which the lead portion of the transducer extends. On the opposite side of said housing 23 is an observation window 24 permitting visual examination of cap 17 and needle 18. Housing 23 terminates in a conduit 25, which leads to an evacuating system. Bellows 11 and transducer 21 are protected from accidental pressure unbalance by a motion limiting screw disk 26 in the top of housing 10. This disk is provided with an insulating ring 27 and a center guard ring 28. The distance between guard ring 28 and the top of the bellows 14 will determine and limit the upward motion of bellows 11. This distance is adjusted by screwing disk 26 up or down until the desired spacing is attained. Likewise, the distance between a flat nut 29 affixed on screw 15 and guard ring 28 will determine and limit the downward motion of bellows 11. This distance is adjusted by screwing nut 29 either up or down until the desired limiting downward spacing is reached. The undesirable effects of vibration are minimized by damping with oil placed within the interior of housing 10 and occupying space 30 surrounding the bellows. The oil is conveniently introduced through screw opening 31. Housing 10 is suitably mounted on rubber shock mounts to further minimize vibration.

Since the bellows is extremely sensitive to any force exerted along its vertical axis, over-expansion and over-contraction of the bellows is to be strictly avoided in preventing permanent distortion thereof. Vertical displacement of the bellows, either up or down, is a function of the flexibility of the particular bellows employed. The extent to which the bellows may be displaced in any instance is such that upon release of the force causing displacement, the bellows will revert to its original shape and position. Under the usual conditions for operation of the micromanometer described herein, the limit of upward motion, that is, the spacing between bellows top 14 and guard ring 28 is ordinarily not greater than about 4 mils. Similarly, the limit of downward motion determined by the spacing between nut 29 and guard ring 28 generally does not exceed about 4 mils.

Figure 3:
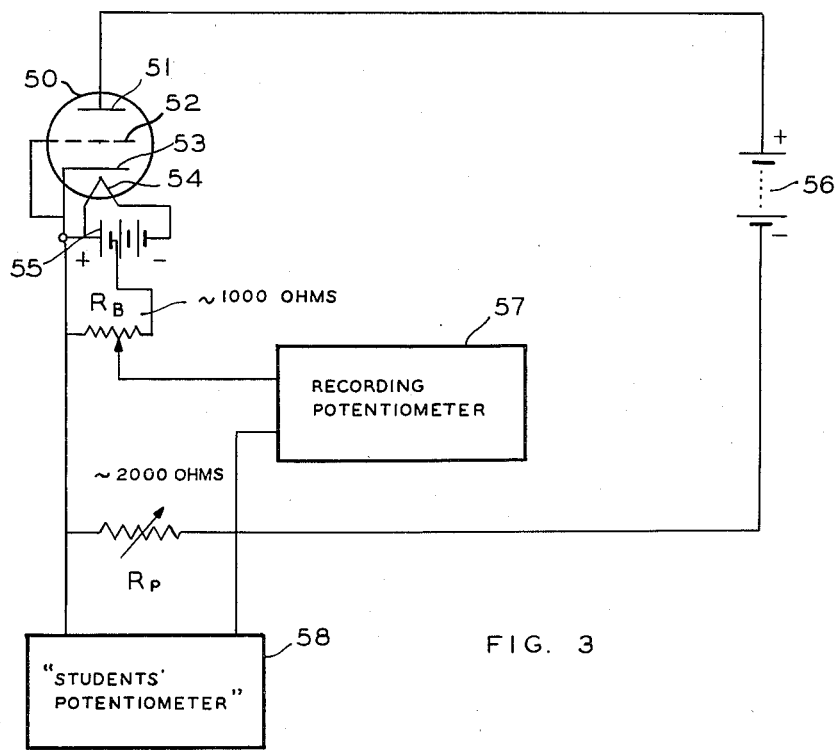
Figure 3 shows a suitable electrical circuit for effecting measurement of gas pressures using the micromanometer of this invention.

After suitable adjustments limiting the desired vertical movement of the bellows have been made, cap 17 is screwed upwards until it makes good physical contact with needle 18. The system, including the interior of housing 23 and the space within housing 10 overlying the oil reservoir, as well as the interior of bellows 11, are then evacuated through conduits 25 and 13, respectively. The procedure for effecting evacuation is as follows: Stopcock 32 in line 25 is opened; stopcock 33 in line 13 is closed; stopcock 34 in line 35, leading to an evacuating pump, is opened and the system is pumped to a desired low pressure. The specific pressure to which the system is pumped is not a critical feature of the procedure, but rather it is essential at this point that the pressure exerted on the exterior of bellows 11 be identical with the pressure exerted on the interior of the bellows. To minimize the effects of gas evolution from housing 23 and damping oil occupying space 30, reservoir bulb 36 is added to the reference vacuum side. After suitable evacuation of the system to a desired reference pressure, stopcock 34 is closed; stopcock 32 is closed; and stopcock 33, leading to the unknown pressure reservoir, is opened. The gas whose pressure it is desired to determine is then led through conduit 13 to the interior of bellows 11. Due to the pressure differential between the reference pressure on the outside of the bellows and the unknown gas pressure on the inside of the bellows, linear displacement of the bellows takes place. This displacement causes a corresponding movement of screw 15, cap 17, needle 18, extension arm 19, and movable element 20 of transducer 21. The slight movement of element 20 with regard to the other elements of the transducer effects a change in the current passing to the transducer plate. The resulting change in plate current is determined by means of a suitable electrical circuit, such as shown in Figure 3, then recorded on a recording potentiometer which has been calibrated against known gas pressures. The pressure differential bringing about the aforesaid change in plate current may thus be readily determined.

While the micromanometer above described is particularly useful for measuring and recording minute gas pressures within the approximate range of 1 to 100 microns, it may likewise be employed in the determination and recordation of rapid changes in gas pressure within this approximate range. Thus, small but rapidly changing pressures either in the vacuum range or at atmospheric or at any other feasible reference pressure may be observed and recorded by means of the present instrument. It is further within the purview of this invention that pressure changes over a broader range, say 1 to 1000 microns or higher, may be measured with the present micromanometer by using a stiffer bellows which is less sensitive to minute pressure changes. Thus, while it is possible to employ the instant micromanometer in the measurement of relatively high pressures by suitable choice of bellows, it is contemplated that the instrument herein described will find its greatest use in the determination of low gas pressures in the approximate range of 1 to 100 microns and in the measurement of rapidly changing pressures within this range. For determination of such pressures, it has been found that bellows of large effective area and high flexibility are required. Bellows constructed of thin metal have been found to fulfill these requirements. Because of the minute bellows displacements encountered which are of the order of about $10^{-5}$ cm. per micron pressure differential, vibration-free mounting and damping of the system are of great importance. The present micromanometer has been found to afford essentially complete protection for tube and bellows from accidental pressure unbalance and to provide a system relatively impervious to transverse vibrations. The instant micromanometer is characterized by high sensitivity so that pressure measurements may be determined within $\pm 0.1$ micron. Its reproducibility is better than $\pm 0.5\%$. A further important advantage of the present micromanometer is its extremely fast response, thereby permitting determination of rapid pressure changes. The fact that the micromanometer of this invention is a recording instrument is also a distinct advantage in providing a ready reference for past pressure measurements, in reducing errors of manual recording and in speeding up the overall time required for determination of any particular pressure measurement resulting in a considerable saving in the time of the operator.

Figure 2:
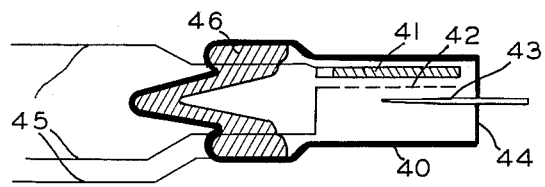
Figure 2 is a cross-sectional diagram showing a suitable mechano-electronic transducer for use in the present micromanometer.

A suitable mechano-electronic transducer for use in the present micromanometer is shown in Figure 2. Such transducers are familiar to those skilled in the art and represent systems wherein voltage is developed by motion of one or more of the elements in an electron tube. While a triode tube has been shown in the attached drawing, it is contemplated that diode, pentode, and other multi-element transducers may be employed to advantage in the present micromanometer. The output voltage in these transducers is generated by motion of one of the elements in the tube. Thus, a mechano-electronic transducer having its plate movable with respect to its grid and cathode or a mechano-electronic transducer having its grid movable with respect to its plate and cathode may be employed. Referring more particularly to the mechano-electronic transducer of Figure 2, which may be considered to be a preferred form of transducer for the micromanometer of this invention, numeral 40 designates the metal envelope of a vacuum tube. Within tube envelope 40, is a fixed cathode 41, a fixed grid 42, and a movable plate (anode) 43. The movable plate passes through a thin flexible metal diaphragm 44 at one end of the tube, which permits movement of this electrode with respect to the other electrodes in the tube. Leads 45 for supplying voltages to the tube are brought out through a glass seal 46 at the opposite end of the tube. For the triode mechano-electronic transducer shown, a change in plate voltage or current output may be obtained by motion of the plate electrode. The change in current output for a constant voltage supply or the change in voltage output for a constant current supply is governed by external mechanical motion exerted on the movable plate. Ordinarily the plate potential is maintained constant so that mechanical displacement of the plate changes the distance between the fixed grid and the plate and results in a change in the plate current. The resultant variation in plate current may then be determined with a suitable electrical recording circuit such as shown in Figure 3.

Referring now more particularly to the circuit of Figure 3, 50 designates the mechano-electronic transducer tube. Within the tube are movable plate 51, grid 52, cathode 53, and filament 54. A 6-volt battery 55 serves as a source of current for filament 54. A battery 56, supplying 45 to 225 volts is used for the plate voltage. The change in plate current $\Delta i_p$, caused by displacement of movable plate 51 is put on a recording potentiometer 57, the steady drop in resistance $R_P$ of about 2000 ohms being balanced by a bucking potential obtained from resistance $R_B$ of about 1000 ohms connected across one 2-volt cell of battery 55.

Since, during operation, the plate and filament voltages obtained from batteries 56 and 55, respectively, will decrease with time, thus causing the plate current, $I_p$, to drop, it is necessary to adjust $R_P$ so as to maintain the product $R_P \times I_p$ constant. Constancy of this voltage is conveniently checked on the student's potentiometer 58. In this fashion, the sensitivity of the micromanometer may be kept constant at any desired value. Zeroing of the recording potentiometer 57 is effected very simply by adjusting the bucking voltage divider $R_B$. Minute changes in plate current and, consequently minute changes in the pressure differential effecting the changes in plate current, are thereby subject to ready determination.

It is to be understood that the above description is merely illustrative of preferred embodiments of the invention of which many variations may be made within the scope of the following claims by those skilled in the art without departing from the spirit thereof.

I claim:

A micromanometer comprising a chamber, a sensitive flexible bellows vertically displaceable in response to pressure disposed within said chamber, there being an opening in the bottom of said chamber, said bellows sealingly surrounding said opening, a conduit affixed to said opening and communicating with the interior of said bellows, means for limiting vertical displacement of said bellows, conduit means connecting said conduit and said chamber on the exterior of said bellows, a valve in said conduit means arranged to shut off and open said conduit means at will, a mechano-electronic transducer having an element displaceable to change the electrical characteristics of said transducer in proportion to the extent of displacement, said transducer having a lead portion at which changes of said electrical characteristics may be utilized, a housing sealingly enclosing a portion of said chamber at the top, said chamber having an opening at the top enclosed by said housing, and said mechano-electronic transducer being mounted in said housing with the said lead portion positioned outside of said housing, means responsive to changes in the electrical characteristics of said transducer to record said changes, an elongated, rigid screw affixed to the top of said bellows, said screw extending through the last said opening and terminating in an adjustable screw cap, a needle maintained in contact with said screw cap, an extension arm holding said needle in a vertical position, said arm being attached to the displaceable element of said mechano-electronic transducer and an observation window in the wall of said housing, affording visual examination of said screw cap and said needle.

References Cited in the file of this patent

UNITED STATES PATENTS

| | | | |
|---|---|---|---|
| 668,514 | Garrels et al. | Feb. 19, | 1901 |
| 1,887,739 | Mott-Smith | Nov. 15, | 1932 |
| 2,025,461 | Leonard | Dec. 24, | 1937 |
| 2,112,682 | Ryder | Mar. 29, | 1938 |
| 2,139,509 | Marcellus | Dec. 6, | 1938 |
| 2,231,570 | Ryder | Dec. 11, | 1941 |
| 2,276,580 | Hofer | Mar. 7, | 1942 |
| 2,437,371 | Allen | Mar. 9, | 1948 |
| 2,503,372 | Bagley | Apr. 11, | 1950 |
| 2,567,253 | Strange et al. | Sept. 11, | 1951 |
| 2,637,998 | Ramser | May 12, | 1953 |
| 2,651,939 | Weaver | Sept. 15, | 1953 |

FOREIGN PATENTS

| | | | |
|---|---|---|---|
| 3,400 | Great Britain | Dec. 17, | 1903 |
| 806,693 | France | Sept. 28, | 1936 |